United States Patent [19]

Pader et al.

[11] 3,855,142

[45] Dec. 17, 1974

[54] ENZYMATIC DENTURE CLEANSER

[75] Inventors: Morton Pader, Teaneck; Carl G. Richberg, Cresskill, both of N.J.

[73] Assignee: Lever Brothers Company, New York, N.Y.

[22] Filed: Sept. 14, 1973

[21] Appl. No.: 397,534

Related U.S. Application Data

[63] Continuation of Ser. No. 163,103, July 15, 1971, abandoned.

[52] U.S. Cl. ............... 252/135, 134/2, 252/89, 252/158, 252/DIG. 12, 424/50
[51] Int. Cl. ............... C11d 3/06
[58] Field of Search ...... 252/89, 135, DIG. 12, 158; 134/2; 424/50

[56] References Cited
UNITED STATES PATENTS

| | | | |
|---|---|---|---|
| 2,922,749 | 1/1960 | Snyder et al. | 252/DIG. 12 |
| 3,451,935 | 6/1969 | Roald et al. | 252/DIG. 12 |
| 3,519,379 | 7/1970 | Blomeyer | 252/DIG. 12 |
| 3,557,002 | 1/1971 | McCarty | 252/DIG. 12 |
| 3,630,924 | 12/1971 | Miller | 424/50 X |
| 3,635,828 | 1/1972 | Benjamin et al. | 252/DIG. 12 |

*Primary Examiner*—Leland A. Sebastian

[57] ABSTRACT

A denture cleanser comprises a lipolytic enzyme of mammalian, microbial, or plant origin admixed with a buffered compatible carrier medium. To decrease the rate of formation of plaque or calculus, or to reduce the amount of accumulated deposits on dentures, the dentures are soaked for a period of 1 to 24 hours in an aqueous medium containing the above-mentioned cleanser.

16 Claims, No Drawings

ENZYMATIC DENTURE CLEANSER

This is a continuation of application Ser. No. 163,103 filed July 15, 1971, now abandoned.

BACKGROUND OF THE INVENTION

1. Field of the Invention

The present invention relates to a process for decreasing the rate of formation of plaque and calculus, and for reducing the amount of accumulated deposits on dentures, comprising contacting dentures with a lipolytic enzyme (lipase) in an aqueous medium, and allowing the denture to remain in contact with the enzyme for a period of time ranging from about 1 minute to about 24 hours. The lipase may be of mammalian, microbial, or plant origin. Especially preferred is lipase extracted from hog pancreas.

Dental plaque forms as a film on dentures while they are in the mouth. Dental plaque is a product of microbial growth, a dense microbial layer consisting of a mass of microorganisms embedded in a matrix, which accumulates on the tooth surfaces. The microorganisms are mainly coccoidal organisms, particularly in early plaque, which, in the mouths of some persons at least, change to filamentous organisms after a few days.

A wide variety of microorganisms are found in the oral cavity, among these being gram-positive organisms presumably comprising Corynebacterium, Actinomyces, and Propionibacterium, Neisseria, Nocardia, Fusobacterium, Veillonella, and Streptococci, such as *S. mutens*, *S. bovis*, *S. salivarius*, and Streptococci of the genus Peptostreptococcus (See Robert J. Fitzgerald in "The Alabama Journal of Medical Sciences" Volume 5, No. 3, July, 1968, pp. 241–242).

Bacteria associated with dental plaque and the development of calculus include, among others, Streptococci, Corynebacterium, and filamentous Nocardia-like organisms. These are gram-positive organisms.

In addition to the aforementioned microorganisms, there are present in plaque other substances such as salivary proteins, carbohydrates, epithelial cells, and leucocytes.

Dental calculus forms when the plaque that has accumulated on the teeth or dentures mineralizes and develops into a hard deposit. Both the bacterial and non-bacterial components of plaque contribute to the formation of calculus, which comprises, in addition to mineralized bacteria, organic constituents, such as epithelial cells, salivary proteins, and leucocytes, and crystals of inorganic substances having molecularly bound calcium and phosphorus, e.g., hydroxyapatite, $3[Ca_3(PO_4)_2] \cdot Ca(OH)_2$, octacalcium phosphate, $Ca_8(HPO_4)_2(PO_4)_4 \cdot 5H_2O$, brushite, $CaHPO_4 \cdot 2H_2O$, and whitlockite, which is considered to have the formula beta-$Ca_3(PO_4)_2$.

Regular brushing of dentures with a conventional brush and dentifrice may for some persons, greatly retard or even prevent the accumulation of plaque and calculus. For other persons however calculus builds up rapidly even with regular brushing, especially on those parts of the denture not easily accessible to the brush.

THE PRIOR ART

The notion that an enzyme to be effective in the removal of inhibition of dental deposits must be of the proteolytic type is exemplified in U.S. Pat. No. 1,133,250 which issued on Mar. 23, 1915, and U.S. Pat. No. 1,222,144 which issued on Apr. 10, 1917, both of which disclose the use of a proteolytic enzyme in a dentifrice.

So far as applicants are aware, patents which have subsequently issued disclosing the use of enzymes in dental preparations have relied also on proteolytic activity for effectiveness.

SUMMARY OF THE INVENTION

It has now been discovered that dentures can be cleaned, and the deposition of plaque lessened or the rate of deposition decreased, by soaking the dentures for a period of at least about 1 minute in an aqueous medium containing a lipolytic enzyme.

Accordingly it is an object of the present invention to provide a process for cleaning dentures by soaking the dentures in an aqueous medium containing a lipolytic enzyme.

It is a further object of the invention to provide a process for decreasing the rate of accumulation of plaque and calculus on dentures comprising repeatedly bringing into contact said denture and an aqueous medium comprising water, a lipolytic enzyme and a buffer, said aqueous medium having a pH between about 4.5 and 10, and said contact being maintained for a period of about 1 minute to about 24 hours.

It is well known that there is an optimum pH range for greatest activity of the lipases. This range varies depending upon the source of the lipase, the rate of hydrolysis, the buffer, and the nature of the fatty substrate. The activity of several lipases in relation to their source is set forth in the text "The Chemistry and Technology of Enzymes," Tauber, 1949, John T. Wiley and Sons, Inc. There is disclosed for example within pages 26–29 of this text that the optimum pH for castor bean lipase is 4.7 to 5.0, and the optimum pH for gastric lipase from this dog is 6.3, from the cat 5.5, from the rabbit 6.3, from the horse 8.6, from the hog 7.9, and from man is 5.5 to 7.9, the optimum pH within this range increasing with increasing molecular weight of triglyceride substrates. The optimum pH for pig's pancreatic lipase is 7 to 8.8.

In the practice of the present invention, the pH of the aqueous medium acting upon the denture may be within the range of about 4.5 to about 10, the specific pH being selected to provide a pH level at which the particular enzyme used is effective.

Accordingly it is a still further object of the invention to provide a denture cleanser comprising a lipolytic enzyme admixed with a buffering agent, or a buffer system. The buffering agent may serve as a carrier or diluent, and may comprise two or more compounds.

The buffering agent is selected to maintain the pH of the system at a level to provide optional enzymatic activity of the particular enzyme employed, and is preferably selected to be inert with respect to the lipolytic action of the enzyme.

In instances where the enzyme-buffer combination has extremely high enzymatic activity so that too little is required for accurate dispensing of use quantities, and where it is not desired to add more buffer, an extender for the buffering agent will be found advantageous. The extender in this instance may be referred to as a dispensing medium, and may be any substance compatible with the buffering agent and with the enzyme, provided that it is water-soluble and non-aqueous. The extender may be in liquid, powder, or granule form and may be any of the specific compounds listed as carriers hereinafter.

It is thus an additional object of the invention to provide a denture cleanser composition comprising a lipolytic enzyme, a compatible buffering agent, and as an extender for said buffering agent, an enzyme-compatible, non-aqueous, water-soluble dispensing medium.

It is another object of the invention to provide a denture cleanser comprising a lipolytic enzyme admixed with a carrier.

It is still another object of the invention to provide a denture cleanser comprising a lipolytic enzyme combined with a buffer to insure that the pH of the enzyme solution is at a level at which the particular enzyme used is optimally effective against the deposits that have accumulated on the denture.

These and other objects of the invention are accomplished by soaking dentures having plaque or other deposits thereon for a length of time of at least about 1 minute and a aqueous medium containing a lipolytic enzyme of mammalian, microbial, or plant origin.

In its broad aspect, the invention relates to a process for decreasing the rate of accumulation of plaque and inhibiting its conversion of calculus on a denture comprising bringing the denture into contact with a lipolytic enzyme in an aqueous medium.

As the art is well aware, enzyme preparations are classified according to their major activity, for example as hydrolases in breaking down or hydrolyzing proteins, carbohydrates, or fatty substances, and are known as proteases, carbohydrases, and lipases respectively. Substantially all commercial enzyme preparations having major activity in one of these three classes, also have at least slight activity in one or both of the remaining two classes, unless the enzyme is specifically purified. The enzymes useful in the practice of the instant invention are those having a major lipolytic activity. Accordingly one embodiment of the invention relates to a process for reducing the amount of debris and plaque and calculus on dentures by contacting the dentures with an enzyme preparation having lipolytic activity as its major function.

In another embodiment of the invention, there is provided a denture cleanser composition comprising a lipolytic enzyme and a buffering agent, which may if desired be admixed with a carrier substance.

In the treatment of dentures encompassed by the instant invention, it is evident, by the very nature of the treatment, that the dentures to be cleaned can remain in contact with the aqueous cleaning medium for as long a time as desired, and there is no upper limit for the time of contact. Of course the soaking period need not be longer than necessary for cleaning, and the time required will not normally be more than 24 hours. The customary overnight soaking, for example from about 7 to about 12 hours, is within the process encompassed by the instant invention. Subsequent wearing of the dentures after cleaning tends to form more deposits, and for best results treatment in accordance with the invention is repeated between wearings.

Suitable buffers are listed in Table I below. The buffer systems useful in the practice of the present invention are by no means limited to the specific systems listed, and persons skilled in the art will recognize the list in Table I as merely representative of the many buffer systems that provide a pH level within the desired range, and will know the concentrations required to provide the desired pH level. In general, the concentrations range from about 0.05M to about 0.1M to provide the listed pH values. Buffer compositions, including those in Table I, are well known and are set forth in a variety of textbooks, among which may be mentioned "The Determination of Hydrogen Ions", Clark, 3rd ed., 1928, The Williams and Wilkens Co., Baltimore, Md. and "A Laboratory Manual of Elementary Physical Chemistry", Mack and France, 1930, D. van Nostrand Company, Inc., New York.

Suitable solid carriers are particulate inorganic substances such as phosphates, chlorides, sulfates, borates, carbonates of inorganic cations, including ammonium. The water-soluble salts are preferred. Carriers may be water-soluble salts of acidic organic substances, said salts being for example citrates, tartrates, acetates, malates, succinates, lactates, malonates, benzoates, phthalates, propionates, salts of carboxymethylcellulose, etc. Or the carrier may be methyl cellulose, cellulose, protein, amino acid, etc.

The carrier may be a normally liquid non-aqueous, water-soluble medium, wherein an enzyme and a buffering agent are dispersed. Suitable media include certain water-soluble monohydric alcohols, water-soluble polyhydric alcohols, and water-soluble ethers thereof, dioxane, etc.

More specifically, media within the above-mentioned classes may be ethanol, n-propanol, isopropanol, ethylene glycol, propylene glycol, heptamethylene glycol, hexylene glycol, glycerol, diethylene glycol, triethylene glycol, the monoalkyl ethers of ethylene glycol and diethylene glycol, wherein the alkyl group has from 1 to about 4 carbon atoms, polyethylene glycols having molecular weights up to about 1500, etc.

It is understood that the carrier must not denature the enzyme, either in an enzyme-carrier system itself or when diluted with water. Those skilled in the art are aware that enzymes, being proteins, can be adversely affected with respect to enzymatic activity by denaturing agents, such as aqueous detergents, appropriate concentrations of urea, etc.

TABLE I

BUFFER SYSTEMS
Molar Proportions

| $KH_2PO_4$ | $Na_2HPO_4$ | $K_2HPO_4$ | Citric Acid | $Na_2CO_3$ | $Na_2B_4O_7$ $-10H_2O$ | $NaHCO_3$ | $NH_4OH$ | $NH_4Cl$ | KNa phthalate | KH phthalate | pH-Temp. |
|---|---|---|---|---|---|---|---|---|---|---|---|
| 1 | 1 | | | | | | | | | | 6.88 at 25°C |
| 11.5 | | 1 | | | | | | | | | 6 at 25°C |
| 1 | | | 11.5 | | | | | | | | 8 at 25°C |
| 1 | 17.8 | | | | | | | | | | 8 at 20°C |
| | 3.4 | | | 1 | | | | | | | 6 at 25°C |
| | 72.0 | | | 1 | | | | | | | 8 at 25°C |
| | | | | | 1 | 1.2 | | | | | 10 at 18°C |

TABLE I—Continued

BUFFER SYSTEMS
Molar Proportions

| $KH_2PO_4$ | $Na_2HPO_4$ | $K_2HPO_4$ | Citric Acid | $Na_2CO_3$ | $Na_2B_4O_7$ $-10H_2C$ | $NaHCO_3$ | $NH_4OH$ | $NH_4Cl$ | KNa phthalate | KH phthalate | pH-Temp. |
|---|---|---|---|---|---|---|---|---|---|---|---|
|  |  |  |  |  |  | 100 |  |  |  |  | 8.3 at 25°C |
|  |  |  |  |  |  |  | 1 | 3 |  |  | 8.9 at 30°C |
|  |  |  |  |  |  |  |  |  | 7.3 | 1 | 6 at 25°C |
|  |  |  |  |  | 100 |  |  |  |  |  | 9.2 at 25°C |
|  | 1.8 |  |  | 1 |  |  |  |  |  |  | 4.6 at 25°C |

The effectiveness of lipolytic enzymes as denture cleansers is demonstrated in aqueous solutions wherein the lipolytic activity is about 20 units to about 50,000 units per 100 ml of solution based on an assay of the enzyme preparation made as described hereinbelow. The preferred range of concentration is about 30 units to about 35,000 units per 100 ml of solution, and about 35 units per 100 ml is a convenient concentration. It will be understood that the word "solution" as used herein includes liquid colloidal suspensions, which may be visually clear or hazy.

Enzyme preparations mentioned herein are identified as follows:

| | |
|---|---|
| Amylase | Alpha-amylase. Supplied by Nutritional Biochemicals Corp. |
| Alcalase: | A trademark of Novo Industri A/S. Derived from Bacillus subtilis. |
| Lipase 448: | A trademark of Nutritional Biochemicals Corp. One gram digests 448 grams of olive oil in one hour at 37°C at a pH of 7.8. |
| Lipase 4000: | A trademark of the Wallerstein Co. The enzyme is of microbial origin. |
| Lipase B: | A trademark of Rohm and Haas. A fungal lipolytic enzyme preparation. |
| "Microbiological Lipase": | Catalogue No. 4835 of Mason Research Laboratories, Inc. |
| Phospholipase C: | Prepared from Clostridium Welchii. Catalogue No. 3441 of Mason Research Laboratories, Inc. |
| Phospholipase D: | Prepared from cabbage leaves. Catalogue No. 8009 of Mason Research Laboratories, Inc. |
| Mylase 100: | A trademark of the Wallerstein Co. Derived from Aspergillus oryzae. |
| Mylase W: | A trademark of the Wallerstein Co. Derived from a fungal source. |
| Rhozyme P-11: | A trademark of the Rohm and Haas Co. This is a highly purified food grade proteolytic enzyme derived from fungal sources. |
| Steapsin: | Supplied by the Nutritional Biochemicals Corp. A lipase obtained from pork pancreas. |
| M-Zyme: | A Merck trademark. Derived from a microbiological source. A proteolytic enzyme having keratinolytic activity. |

PREPARATION OF ANIMAL PANCREATIC LIPASE

Pancreatic lipase has been prepared in many ways. In one, the pancreas is dried, ground, treated with acetone, and then treated with ether. The fat-free ground residue is further ground or powdered. The enzyme may be used in this form, or may be further purified by methods known to those skilled in the art, for example by extraction with buffered aqueous solutions, by crystallization or electrophoresis, or by a combination of purification steps.

Animal pancreatic lipase may also be prepared by the method described in U.S. Pat. No. 2,503,313 to Levin, whereby water is removed from minced pancreas by azeotropic distillation, using a fat solvent such as ethylene dichloride, separating the fat solvent containing dissolved fat, extracting again with fresh solvent, removing the solvent, and grinding the residue containing the enzymes to a fine powder.

Methods for the preparation and purification of lipases may be found in the treatise "The Enzymes," J. B. Sumner and K. Myrback, Volume I, part 1, Academic Press, (1950).

PREPARATION OF MICROBIAL LIPASE

A lipase of microbial origin suitable for use within the present invention may be prepared by the method described in U.S. Pat. No. 3,194,738 and set forth in essential detail below.

The microorganism that may be selected from the Aspergillus oryze-niger group, or from a species of Aspergillus such as Asperigillus oryze, e.g., such as the microorganism filed in the American Type Culture Collection in Washington, D.C. under catalogue No. 14605, is grown on a moist nutrient medium of for example crushed or broken grain, at temperatures between 15°C and 35°C. The nutrient medium, to which a triglyceride may be added if desired, is mixed with water, and the moisture is inoculated with a heavily spored culture of the microorganism, preferably 0.01 to 0.10 of the culture medium by weight, and the inoculated medium maintained within the temperature range specified for about 48 to 144 hours until an enzyme composition can be separated that has the desired activity as measured by standard procedures which are discussed in greater detail hereinafter. After an enzyme composition of desired activity has been obtained, growth is interrupted by drying the medium, preferably below 60°C, or the enzyme may be isolated by extraction or precipitation, as by the addition of a water miscible, volatile, organic solvent such as ethyl alcohol, isopropanol or acetone. The precipitated product may be dried, if desired.

More detailed descriptions for the preparation of enzymes are shown in "Enzyme Technology" in "The Enzymes" Part 2, Vol. II (1952) and in "Economic Botany," Vol. 5, No. 2, pages 126–144 (1951) in an article entitled "Microbiological Production of Enzymes and Their Industrial Applications".

A lipase of microbial origin suitable for use within the present invention may also be prepared from the Rhizopus arrhizus var. delemar, Registration No. 1916, Museum of Natural History, Paris, by a procedure described in U.S. Pat. No. 3,513,073 to R. Y. Mauvernay, et al. By this procedure, the aforementioned strain is cultured in a medium having as the carbon source preferably starches, dextrins, or hydrolyzed flours; as the nitrogen source preferably ammonium salts, nitrates, soluble maize extract, peptones, or casein; and as minerals preferably potassium, magnesium, calcium, phosphorus, sulfur, and chlorine.

Culturing is continued at a temperature of 20° to 35°C, until the enzymatic activity is constant. The medium is filtered, and the lipase is precipitated from the filtrate by the addition of acetone or ammonium salts. The precipitate is centrifuged and dried under vacuum to produce a lipase having good enzymatic activity.

PREPARATION OF PLANT LIPASE

A lipase may be obtained in good yield from castor bean. The beans are dehulled, ground, and extracted to remove fatty substances, then dried, and further ground.

A lipase may similarly be prepared from wheat germ. Whole wheat germ is extracted to remove fatty material, dried and ground, then extracted with cold water. The solution is centrifuged and the supernatant solution adjusted to pH 5.5, forming a suspension. This is centrifuged and the supernatant solution adjusted to pH 6.6. The enzyme is precipitated with $(NH_4)_2SO_4$, separated, and preserved in the lyophilized state. For the details of this preparation see T. P. Singer, "On the Mechanism of Enzyme Inhibition by Sulfhydryl Reagents," J. Biol. Chem. 174, 11 (1948).

METHOD FOR DETERMINING LIPOLYTIC ACTIVITY

Aqueous Enzyme Suspension:

A suspension of 10 mg of enzyme preparation per ml of distilled water is prepared.

Reagents:

Tween 20. The commercial product can be used directly, but it is preferable first to extract the free fatty acids. 30 ml of Tween 20 and 50 ml of a mixture of one part of diethyl ether and two parts of petroleum ether are placed in a 100-ml glass-stoppered centrifuge flask. The mixture is acidified with 0.25 ml of phosphoric acid, shaken, and centrifuged. The ether layer is rejected, and the extraction repeated with 25 ml of the mixture. Finally, the ethers dissolved in the Tween 20 are removed in vacuo, and the residue neutralized with NaOH, then decanted from the crystals of sodium phosphate.

Sodium acetate, 0.2 N.
Aqueous solution of phenol red, 0.02%
NaOH, 0.02 N.
Decyl alcohol.

Tween 20, a trademark of Atlas Chemical Industries, is polyoxyethylene sorbitan monolaurate.

PROCEDURE:

The substrate is prepared by mixing 100 ml of buffer with 50 ml of Tween 20, 10 ml of the indicator, and 90 ml of distilled water. The pH of the mixture is about 7.2, and the substrate can be used for about a week, with a gradual decrease in pH and an increase in the control blanks. To 1 ml of the enzyme preparation is added 5 ml of the substrate, and the test tube is stoppered and placed in a thermostat at 20°. After 9 minutes a drop of decyl alcohol is added to prevent foaming, and the solution is titrated so as to reach the end point at exactly 10 minutes after the mixing of the substrate and the enzyme. The content of the test tube is kept stirred during the titration by a slow stream of nitrogen, which also prevents the absorption of $CO_2$. Blank values are obtained by titrating under identical conditions separately 5 ml of the substrate and 1 ml of the enzyme preparation. The difference between the alkali consumed in the test and the sum of the two blank values is taken as the measure of the enzyme activity, and there is a direct proportionality up to 3 ml of 0.02 N NaOH. The indicator is yellow at the beginning, and its transition from rose to red-violet is taken as the end point (pH 8.3). By definition, 1 ml of 0.02 N NaOH is taken as corresponding to 100 lipase units.

In connection with the foregoing procedure, reference is made to the National Formulary, 10th Edition, 1955, and to the text "Methods in Enzymology," Volume I, Colowick and Kaplan, Academic press, 1955.

The lipolytic activities of some enzyme preparations expressed in Lipase Units as determined by the above procedure are:

| Enzyme Preparation | Lipase Units |
|---|---|
| Lipase 4000 | 282 |
| Rhozyme P-11 | 12 |
| Steapsin | 74 |
| Lipase 448 | 355 |

The mechanism by which the lipolytic enzymes of the present invention remove dental plaque and calculus from dentures is not thoroughly understood, since dental plaque is composed mainly of proteinaceous material. The total lipid content of calculus is nearly 0.2 percent, as shown by Mandel and Levy, Oral Surg. 10, 874 (1957). While the inventors do not wish to be held by any hypothesis, it appears possible that a lipolytic enzyme may dissociate a lipid from a nucleating factor before it becomes part of the plaque.

For a further understanding of the invention reference is made to the following Examples, which are illustrative but not limitative, of the invention.

EXAMPLE 1

The following example illustrates the action of a lipase in reducing calculus formation and demonstrates the superiority of a lipolytic enzyme over both proteolytic and amylolytic enzymes.

The comparative efficacies are determined by a dipping technique in the following manner in which glass plummets are dipped in and out of a calcifying solution containing porcine submaxillary mucin continuously for 22 hours per day, the dipping being interrupted to immerse the plummet in a lipolytic enzyme solution. The test procedure is as follows.

The dipping apparatus consists of a series of horizontal bars from which glass plummets are suspended by means of stainless steel wires. The bars and attached plummets are driven up and down through a vial of porcine submaxillary gland extract exposing the plummets to the extract one-half of the cycle and to the atmosphere the other half cycle. The apparatus is enclosed in a constant temperature cabinet (37°± 1°) with high relative humidity. The glass plummets are rectangular sheets of glass measuring 8mm ×14mm.

The plummets are immersed for one minute in a solution of the enzyme to be tested. After this treatment, each plummet is rinsed thoroughly with distilled water and placed in the machine. The dipping is then started.

After 22 hours, the plummets are removed, rinsed with distilled water, retreated and rinsed again. The porcine extract is replaced with fresh extract and the dipping sequence restarted.

The plummets are dipped in this manner for a total of 8 days. After this dipping period, the plummets are allowed to dry and are examined under a 10-power binocular microscope.

The plummets are rated visually as to how much material has accumulated as compared to a control plummet that is not treated with an enzyme. The visual ratings are made on a scale of 1 to 5, representing the extent of deposit according to the following scheme.

| | | |
|---|---|---|
| 1 = 5–10% | area covered by deposits | (very light) |
| B = 10–30% | do. | (light) |
| 3 = 30–60% | do. | (moderate) |
| 4 = 60–90% | do. | (heavy) |
| 5 = 90–100% | do. | (very heavy) |

The material on the plummet is then submitted to X-ray crystallographic analysis to determine the presence or absence of hydroxyapatite.

The solutions of the enzyme to be tested are prepared as follows:

Prepare a calcifying solution by mixing together the following:

1. 65 ml distilled water,
2. 70 ml of a solution made by bubbling $CO_2$ through a suspension of 0.025 gram of calcium carbonate in 100 ml water until the solution is clear. The pH is about 6.8.
3. 15 ml of a phosphate buffer solution having a pH of 7.4 prepared by mixing 20 volumes of a solution of 8.00 grams of $NaH_2PO_4$ per liter of distilled water with 80 volumes of a solution of 9.47 grams of $Na_2HPO_4$ per liter of distilled water.

Add to the calcifying solution, with stirring, 0.5 percent lyophilized porcine extract. Stir for 1 hour. Store at 4°C until used, but no longer than 48 hours.

The enzymes which are tested by the foregoing procedure and the results obtained are shown in Table II, below. The figures are the average of 5 replicate runs.

From the data in Table II the greater efficacy of the lipolytic enzyme is clearly evident in the combination of the desirably low visual rating, the amorphous nature of the deposit, and the relatively high reduction in amount of deposit as compared with a control.

form to a flat-bottom 8 ml vial 4.5 cm high and 1.5 cm in diameter. Preparations are made in triplicate. Five ml of calcifying solution are added to each vial, mixed thoroughly with a magnetic stirring bar and placed in the dipping apparatus. The enzyme in calcifying solution is prepared fresh daily for a total of eight days. The plummets, containing the calculuslike deposits, are removed after the eighth day, allowed to air-dry for two additional days, and subjected to a deposit rating and X-ray analysis for hydroxyapatite. Five controls, containing only calcifying solution, are tested along with the enzyme-containing vials. One control, which is allowed to build up a sizeable deposit for six days, is placed in a calcifying solution containng 1.3 mg of lipase 448 for 2 days. The purpose of this experiment is to determine whether lipase 448 possesses the ability to dissolve a well-formed plaque.

The calcifying solution has the following composition:

| Component | Volume (ml) | Weight (g) |
|---|---|---|
| 0.005M sodium taurocholate | 65 | — |
| $CaC)_3$ solution (0.025 g/100 ml) | 70 | — |
| phosphate buffer, pH 7.4 | | |
| 0.0665M $NaH_2PO_4$ | 3 | — |
| 0.0665M $Na_2HPO_4$ | 12 | — |
| lyophilized, porcine submaxillary extract | — | 0.75 |

The enzymes tested and the effectiveness against plaque deposition at pH 7.4 is shown below.

| Enzyme | Plaque Deposition Score[a,b] | Hydroxyapatite Pattern |
|---|---|---|
| no enzyme (control) | 3.0 | strong |
| Lipase 448 | 1.0 | amorphous |
| 6 day control treated 2 days with Lipase 448 | 2.0 | strong |
| Lipase B | 2.0 | strong |
| microbiological lipase | 2.5 | strong |
| phospholipase C | 3.0 | strong |
| phosphilopase D | 2.5 | strong |

[a] light deposit = 1
medium deposit = 2
heavy deposit = 3
very heavy deposit = 4
[b] the score was obtained by averaging the results of 3 investigators.

TABLE II

| Enzyme | Level | Major Enzyme System | Visual Rating | Crystallography | % Weight Reduction over control (Avg 5 plummets) |
|---|---|---|---|---|---|
| Lipase 448 | 0.3% | Lipolytic | 1.0 | Amorphous | 35.7 |
| Rhozyme P-11 | 0.3% | Proteolytic | 2.5 | Hydroxyapatite | 13.3 |
| M-Zyme | 0.3% | Proteolytic | 3.0 | Hydroxyapatite | −15.0 (gain) |
| Amylase | 0.3% | Amylolytic | 4.0 | Hydroxyapatite | −93.0 (gain) |
| Alcalase | 0.3% | Proteolytic | 3.0 | Hydroxyapatite | −22.0 (gain) |
| Mylase 100 | 0.3% | Proteolytic | 3.0 | Amorphous | −2.6 (gain) |
| Mylase W | 0.3% | Proteolytic | 2.5 | Hydroxyapatite | 0.4 |
| Control-no enzyme | — | — | 5.0 | Hydroxyapatite | — |

EXAMPLE 2

The effectiveness of neutral lipases and phospholipases in retarding calculus-like deposits is determined by the test procedure described in Example 1. For the first experiment, each enzyme (1.3 mg) is added in dry The enzymes named above are identified hereinbefore.

The above results show the effectiveness of a lipolytic enzyme in retarding the formation of plaque and of reducing the amount of plaque on a solid substrate.

Lipase 448 demonstrates a marked repressive function. Lipase B shows a moderate suppression of plaque. X-ray analysis shows that Lipase 448 prevents hydroxyapatite formation and promotes an amorphous plaque structure, which, being more readily removable from the denture, is less undesirable than a hydroxyapatite deposit.

Treatment of a 6 day old, well-formed plaque with Lipase 448 causes a noticeable reduction in the plaque deposit. The enzyme apparently possesses the property of disintegrating some of the organic matrix. The X-ray analysis of this 448-treated plaque shows, however, a strong HA pattern.

EXAMPLE 3

The effectiveness of a lipase in retarding the rate of formation of plaque and calculus on dentures is determined by a test in which the dentures are subjected to plaque and calculus forming conditions in vivo. The dentures are worn in the human mouth in the normal manner, and removed daily and soaked for one minute in an aqueous solution of 1 percent Lipase 448. After 1 month the denture is continued to be worn, but is not treated. Daily inspection during the two periods shows that the enzyme treatment greatly reduces plaque and calculus formation on dentures.

EXAMPLE 4

A test is made similar to that described in Example 3 except that the control constitutes a second denture worn by a second human subject, and the control denture is treated daily by a 1-minute immersion in an aqueous solution of 1 percent Lipase 448 which has been inactivated by heat treatment. Both subjects are known to be plaque formers. After four weeks there is complete inhibition of plaque and calculus by the non-inactivated enzyme, while calculus accumulates at an estimated normal rate on the denture treated with the heat-inactivated enzyme.

EXAMPLE 5

The following composition has a pH of about 8 when 2.57 gm are dissolved in sufficient water to make 100 ml of solution.

| | Grams | Percent By Weight |
|---|---|---|
| Lipolytic enzyme having an assay of 355 lipase units per 10 milligrams | 0.25 | 9.7 |
| $KH_2PO_4$ | 0.19 | 7.4 |
| $K_2HPO_4$ | 2.13 | 82.9 |
| | 2.57 | 100.0 |

EXAMPLE 6

The following composition may be dissolved in 100 ml water at a concentration of 1.59 grams per 100 ml of solution to provide a lipolytic enzyme solution having a pH of 6 suitable for the cleansing of dentures.

| | Grams | Percent By Weight |
|---|---|---|
| Enzyme having a lipolytic activity of 12 units per 10 milligrams | 0.05 | 3.2 |
| $Na_2HPO_4$ | 1.07 | 67.2 |
| Citric acid monohydrate | 0.47 | 29.6 |
| | 1.59 | 100.0 |

EXAMPLE 7

The following composition has a pH of about 8.3 when 10 gm are diluted to a total of 100 ml with water to provide an effective denture cleanser.

| | Percent By Weight |
|---|---|
| Lipolytic enzyme having an assay of 355 lipase units per 10 milligrams | 2.5 |
| $NaHCO_3$ | 20.1 |
| Glycerol | 77.4 |
| | 100.0 |

Having described the invention and having set forth the best modes for the practice thereof, variations and modifications within the spirit of the invention will occur to those skilled in the art, and the invention is to be limited only within the scope of the appended claims.

What is claimed is:

1. A denture cleanser composition comprising a lipolytic enzyme at a concentration to provide lipolytic activity of about 20 to about 50,000 lipase units in 100 ml of a solution of said composition, admixed with a buffering agent, said buffering agent being capable of providing a pH of about 4.5 to about 10 and being inert with respect to the lipolytic action of the enzyme.

2. A denture cleanser in accordance with claim 1 wherein said enzyme is of mammalian origin.

3. A denture cleanser in accordance with claim 1 wherein said enzyme is of microbial origin.

4. A denture cleanser in accordance with claim 1 wherein said enzyme is of plant origin.

5. A denture cleanser in accordance with claim 1 wherein said enzyme is a castor bean lipase and said buffering agent provides a pH of 4.7 and 5.0.

6. A denture cleanser in accordance with claim 1 wherein said enzyme has lipolytic activity as its major function and wherein said buffering agent comprises a mixture of sodium or potassium orthophosphates capable of providing a pH of about 7.4.

7. A denture cleanser in accordance with claim 1 wherein said cleanser is in tablet form.

8. A composition in accordance with claim 1 capable of retarding the accumulation of plaque or calculus on dentures comprising a pancreatic lipase and a buffering agent capable of providing a pH of about 7.4.

9. A denture cleanser composition in accordance with claim 1 comprising a lipolytic enzyme, a compatible buffering agent and as an extender for said buffering agent, an enzyme-compatible, non-aqueous, water-soluble dispensing medium selected from the group consisting of water-soluble monohydric alcohols, water-soluble polyhydric alcohols and water-soluble ethers thereof.

10. A denture cleanser in accordance with claim 9 wherein said enzyme has lipolytic activity as its major function and has an activity of about 355 lipase units per 10 milligrams, said buffering agent is sodium bicarbonate, and said non-aqueous, water-soluble medium is glycerol.

11. An aqueous medium capable of retarding the accumulation of plaque of calculus on dentures comprising water and a lipolytic enzyme at a concentration to provide between about 20 units and 50,000 units per 100 millimeters, said aqueous medium having a buffered pH between about 4.5 and 10.

12. A denture cleanser composition in accordance with claim 1 comprising a lipolytic enzyme, a compatible buffering agent and as an extender for said buffering agent an enzyme-compatible, non-aqueous, water-soluble dispensing medium selected from the group consisting of ethanol, n-propanol, isopropanol, ethylene glycol, propylene glycol, hexylene glycol, heptamethylene glycol, glycerol, diethylene glycol, triethylene glycol, the mono-alkyl ethers of ethylene glycol and diethylene glycol wherein the alkyl group has from 1 to about 4 carbon atoms, polyethylene glycols having molecular weights up to about 1,500, and dioxane.

13. A process for decreasing the rate of accumulation of plaque and calculus on dentures comprising maintaining said dentures in contact with an aqueous medium comprising water, a lipolytic enzyme at a concentration to provide lipolytic activity of about 20 to about 50,000 lipase units per 100 milliliters of solution, and a buffering agent, said buffering agent being capable of providing a pH of about 4.5 to about 10, and being inert with respect to the lipolytic action of the enzyme, and said contact being maintained for a period of about 1 minute to about 24 hours.

14. A process in accordance with claim 13 wherein said lipolytic enzyme is of microbial origin and has a lipase activity of about 282 lipase units per 10 milligrams.

15. A process in accordance with claim 13 wherein said lipolytic enzyme is of mammalian origin.

16. A process in accordance with claim 13 wherein said lipolytic enzyme is of plant origin.

* * * * *